United States Patent
Forlines et al.

(10) Patent No.: US 7,179,171 B2
(45) Date of Patent: *Feb. 20, 2007

(54) FISH BREEDING TOY FOR CELLULAR TELEPHONES

(75) Inventors: Clifton L. Forlines, Cambridge, MA (US); Joseph W. Marks, Belmont, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 677 days.

This patent is subject to a terminal disclaimer.

(21) Appl. No.: 10/178,584

(22) Filed: Jun. 24, 2002

(65) Prior Publication Data

US 2003/0236119 A1  Dec. 25, 2003

(51) Int. Cl.
 A63F 13/00 (2006.01)
 A63F 9/24 (2006.01)
 G06F 17/00 (2006.01)
 G06F 19/00 (2006.01)

(52) U.S. Cl. ............... 463/41; 463/1; 463/40; 463/43; 345/581; 345/619; 345/629

(58) Field of Classification Search ............ 463/1, 463/7, 36–44, 46, 47; 273/148 R, 148 B; 345/581, 619, 629, 634, 473
See application file for complete search history.

(56) References Cited

U.S. PATENT DOCUMENTS 4,841,291 A * 6/1989 Swix et al. ............. 345/473
5,491,777 A * 2/1996 Mase et al. .............. 463/31
5,572,646 A * 11/1996 Kawai et al. ............ 345/501
5,580,308 A * 12/1996 Nakamura ............... 463/7
5,706,417 A * 1/1998 Adelson .................. 345/640
5,733,131 A * 3/1998 Park ....................... 434/307 R
5,808,591 A * 9/1998 Mantani .................. 345/82
5,831,590 A * 11/1998 Ikedo ...................... 345/629
5,867,166 A * 2/1999 Myhrvold et al. ....... 345/419
5,971,855 A * 10/1999 Ng .......................... 463/42
5,990,860 A * 11/1999 Takeuchi ................. 345/667
6,130,661 A * 10/2000 Ilbery ..................... 345/596
6,165,068 A * 12/2000 Sonoda et al. ........... 463/8
6,171,189 B1  1/2001 Katano et al. ........... 463/43
6,195,078 B1 * 2/2001 Dinwiddie et al. ...... 345/636

(Continued)

OTHER PUBLICATIONS

Alien Fish Exchange, nGame, Dec. 1999-Feb. 2000, Charlie Dancey, Matt Kelland, and Mark Minto, www.alienfishexchange.com, pp. 1-71.*

(Continued)

*Primary Examiner*—Xuan M. Thai
*Assistant Examiner*—Binh-An D. Nguyen
(74) *Attorney, Agent, or Firm*—Dirk Brinkman; Andrew J. Curtin

(57) ABSTRACT

A cellular telephone breeding toy includes a memory storing genetic traits of corresponding breedable virtual fish. The memory also stores sets of image templates, there being at least one genetic trait associated with each image template. A keypad is used to select one or more of the virtual fish, and to render the virtual fish according to the genetic traits and the sets of image templates. Lineage of the virtual fish can also be displayed, and the virtual fish can be traded between cellular telephones using communications protocols. Genetic traits of two virtual fish can be combined randomly to generate off-springs.

12 Claims, 18 Drawing Sheets

U.S. PATENT DOCUMENTS

| | | | |
|---|---|---|---|
| 6,203,425 B1 * | 3/2001 | Hayashi | 463/1 |
| 6,213,871 B1 * | 4/2001 | Yokoi | 463/7 |
| 6,213,872 B1 * | 4/2001 | Harada et al. | 463/7 |
| 6,239,807 B1 * | 5/2001 | Bossut | 345/582 |
| 6,251,010 B1 * | 6/2001 | Tajiri et al. | 463/1 |
| 6,251,012 B1 * | 6/2001 | Horigami et al. | 463/7 |
| 6,266,068 B1 * | 7/2001 | Kang et al. | 345/629 |
| 6,268,872 B1 * | 7/2001 | Matsuda et al. | 345/473 |
| 6,275,236 B1 * | 8/2001 | Delahunty | 345/30 |
| 6,347,993 B1 * | 2/2002 | Kondo et al. | 463/1 |
| 6,348,918 B1 * | 2/2002 | Szeliski et al. | 345/419 |
| 6,368,211 B1 * | 4/2002 | Suzuki | 463/7 |
| 6,402,617 B2 * | 6/2002 | Gouji et al. | 463/37 |
| 6,449,518 B1 * | 9/2002 | Yokoo et al. | 700/86 |
| 6,466,205 B2 * | 10/2002 | Simpson et al. | 345/419 |
| 6,482,067 B1 * | 11/2002 | Pickens | 446/268 |
| 6,494,762 B1 * | 12/2002 | Bushmitch et al. | 446/268 |
| 6,602,132 B2 * | 8/2003 | Kozawa et al. | 463/7 |
| 6,668,080 B1 * | 12/2003 | Torr et al. | 382/173 |
| 6,690,376 B1 * | 2/2004 | Saito et al. | 345/473 |
| 6,711,278 B1 * | 3/2004 | Gu et al. | 382/103 |
| 6,722,989 B1 * | 4/2004 | Hayashi | 463/43 |
| 6,748,326 B1 * | 6/2004 | Noma et al. | 702/3 |
| 6,755,745 B1 * | 6/2004 | Seto et al. | 463/43 |
| 6,774,900 B1 * | 8/2004 | Kubota et al. | 345/473 |
| 6,800,013 B2 * | 10/2004 | Liu | 446/297 |
| 6,814,662 B2 * | 11/2004 | Sasaki et al. | 463/1 |
| 6,820,112 B1 * | 11/2004 | Matsuda et al. | 709/203 |
| 2002/0142840 A1 * | 10/2002 | Wolinsky | 463/41 |

OTHER PUBLICATIONS

Alien Fish Exchange, Wireless Gaming Review, (www.wgamer.com/gamedir/game-203q=), Live and let breed!—the secrets of Alien Fish Exchange by Ann Garner from nGame (posted: monday, Dec. 16, 2002, pp. 2-5), pp. 1-8.*

Wireless Game Directory: Search, Wireless Gaming Review, pp. 1-7.* nGame Lauches Their First Commercial Wireless Games Service in Canada—Brief Article, Wireless Internet, Sep. 2001, pp. 1-2.* nGame Builds on its Strengths, Wireless Gaming Review, pp. 1-3.*

WAP Gaming by James Hills, Gamespy articles, pp. 1-2.*

* cited by examiner

| Gene Pair | Number of Phenotypes | Number of Genotypes | Dominance Characteristics |
|---|---|---|---|
| The base color of the koi. | 12 | 15 | Co-dominant |
| The color of the primary pattern. | 12 | 15 | Co-dominant |
| The primary pattern's edge style. | 2 | 3 | Recessive |
| The primary pattern's edge color. | 12 | 15 | Co-dominant |
| The shape of markings on the head. | 3 | 3 | Semi-dominant |
| The shape of the primary pattern. | 3 | 3 | Semi-dominant |
| A lightning like shape for the primary pattern. | 2 | 3 | Recessive |
| The primary pattern's density. | 127 | 127 | Polygenic |
| Whether or not the koi has a black secondary pattern. | 2 | 3 | Dominant |
| The secondary pattern's density. | 127 | 127 | Polygenic |
| The sex of the koi. | 2 | 2 | Dominant |
| Whether or not the koi is shiny. | 2 | 3 | Recessive |
| The size of the koi's head. | 3 | 3 | Semi-dominant |
| The size of the koi's body. | 3 | 3 | Semi-dominant |
| The size of the koi's tail. | 3 | 3 | Semi-dominant |
| The size of the koi's fins. | 3 | 3 | Semi-dominant |

*Fig. 2*

| Location in keypad coordinates | Description |
|---|---|
| 1 | Quits the digi-koi application. Confirmation is required. |
| 2 | Produces a new name for the digi-koi. The user can repeatedly invoke this action until an acceptable name appears. |
| 3 | Shows how many more matings are possible. When the number reaches zero the digi-koi can no longer be selected as a parent. |
| 4 | Sets the digi-koi as the father or mother for mating, depending on its gender. Once two parents have been selected, the user can return to the pond-browsing view and populate empty cells with the parents' offspring. |
| 5 | Switches back to pond-browsing mode. Button 5 is used for all mode-changing actions in the digi-koi application. |
| 6 | Causes the digi-koi's lineage to be displayed. Parents and grandparents are shown – see Fig. 3. |
| 7 | Removes the digi-koi from the pond permanently. Confirmation is required – see Fig. 6. The vacated cell can be reused to house another digi-koi. |
| 8 | Switches to a full-screen view of the digi-koi. Button 5 is used to return from full-screen view to the action menu. |
| 9 | Initiates a dialogue for trading the digi-koi. The dialogue requires the user to input the phone number of the intended recipient – see Fig. 7. |

| Color Gene 1 / Color Gene 2 | White | Black | Red | Blue | Yellow |
|---|---|---|---|---|---|
| White | White | Black | Red | Blue | Yellow |
| Black | Black | Black | Dark Red | Dark Blue | Dark Yellow |
| Red | Red | Dark Red | Red | Purple | Orange |
| Blue | Blue | Dark Blue | Purple | Blue | Green |
| Yellow | Yellow | Dark Yellow | Orange | Green | Yellow |

*Fig. 10*

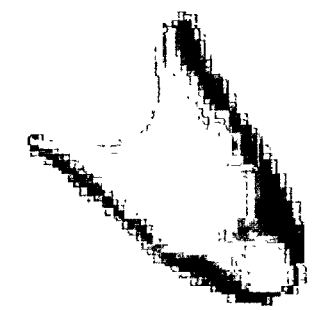
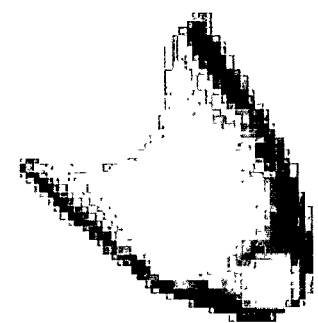
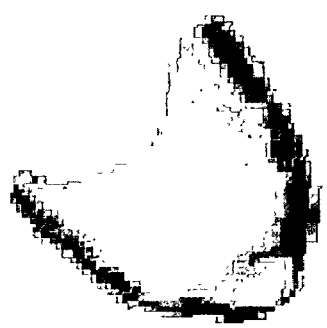
Fig. 14

FISH BREEDING TOY FOR CELLULAR TELEPHONES

FIELD OF THE INVENTION

The present invention relates generally to toys, and more particularly to software based-toys for cellular telephones.

BACKGROUND OF THE INVENTION

An important aspect of playing with games or toys is the setting, and the frequency of playing. Stringer et al., in "Who Wants to Play? Beginning Research into Mobile Gaming," Designing Ubiquitous Computing Games Workshop, Proc. of UbiCOMP 2001, describe a class of "Games that Go in the Gaps." By their definition, these are playing activities that fit in-between events and activities of our daily lives and are easily stopped and restarted. Opportunities for play may arise while commuting, or waiting for a meal or appointment.

Cellular telephones offer game and toy designers and players unique challenges and opportunities. When compared with personal computers (PCs) for playing, cellular telephones have a limited amount memory and processing, and the input/output (I/O) are also severely limited, e.g., a small number of keys and a low resolution display screen, with limited rendering primitives. Cellular telephones are not designed for playing and quality rendering. Conventional rendering techniques are not applicable to cellular telephones, particularly if high quality graphics images are desired. However, cellular telephones have good communication capabilities, including short messaging service (SMS), are portable, and there are literally hundreds of millions units deployed.

Computer "games" and software "toys" should be distinguished to highlight different styles of interaction. A game is usually played until an end condition is reached, for example, a player wins or looses, or a score is awarded. In contrast, playing with a toy does not imply a score or an aim to achieve some end-condition, interaction with a toy is a more creative, ongoing, open-ended experience. Often, toys allow the player to enjoy the experience of real-world activities, such as the hobby of fish breeding.

Alien Fish Exchange is a multi-player fish breeding game for wireless access protocol (WAP) cellular telephones. Alien Fish Exchange is marketed by nGames Ltd, Cambridge, England. In Alien Fish Exchange players compete against each other to produce the most exotic fish possible. Players gain points by selling these fish to restaurants that pay based on the rarity of the breed. The emphasis of that game are on the economics of the fiscal facets of the game, and the fanciful unrealistic, i.e., "alien" representation of the fish.

Maxis, Orinda, Calif., published a virtual fish tank for a PC using a program called el-Fish. Maxis also produces other well known simulation programs such as SimCity, SimAnt, SimLife, and SimEarth. The purpose of the el-Fish program is to create simulated aquariums. El-Fish allows the user to select the tank shape, and bottom and background texture. The tank can be filled with computer generated plants, rocks, coral, and underwater statutes, or other underwater debris.

Simulated fish are created using over 800 parameters of behavior, color, size, and shape of the simulated fish. New fish, having variations in color and shape, are created by "evolution" or "breeding." Evolution recombines the parameters of an individual fish, while breeding combines the parameters of two fish in an unnatural way. There is a value for each parameter that indicates its "strength." When two fish mate, their offspring takes the parameter with the higher value. The weaker parameter may modify the stronger parameter slightly. Breeding a fish with desired attributes is difficult. For example, breeding two fish with long fins can result in an offspring with no fins at all. Both of these methods can produce mutant fish that can no longer breed or evolve. In a third method, the parameters are manipulated by the user.

The fish generation in el-Fish is not realistic, e.g., fish can be bred according the spelling of peoples names, the Gettysburg Address, colors of candy in a bag of M&Ms, the digits in $\pi$, etc, to produce bizarre looking fish. Fish can also be animated with accompanying music. Fish simulation requires a powerful PC class processor with a math co-processor, 8 MB of random access memory, 15 MB of disk storage, and a VGA color monitor, clearly beyond the limited capabilities of a cellular telephone.

CyberLife Technology markets a line of breeding and nurturing software for children with few set goals called Creatures. Creatures have a large set of "genes" resulting in a large number of physical and behavioral variations. Players direct the development of their creatures over time by interacting with them. Creatures focuses largely on the nurturing of pets, and not their aesthetics. Like el-Fish, the breeding of Creatures also occurs in an unnatural way. When two Creatures mate, each gene of their offspring is taken in whole either from their mother or their father randomly. Genes do not adhere to the real-world Mendelian genetics.

Other software with an aesthetic or evolutionary focus include those described by Sims in "Evolving Virtual Creatures," Computer Graphics, Siggraph '94 Proceedings, pp.15–22, July 1994, Sims "Evolving 3D Morphology and Behavior by Competition," "Artificial Life IV Proceedings," Brooks & Maes editors, MIT Press, pp.28–39, 1994, Sims "Artificial Evolution for Computer Graphics," Computer Graphics, Siggraph '91 Proceedings, pp. 319–328, July 1991, and Todd et al., "Evolutionary Art and Computers," New York: Academic Press, 1992.

Danesh et al., in "Geney: Designing a Collaborative Activity for the Palm Handheld Computer," Proceedings of CHI, Conference on Human Factors in Computing Systems, April 2001, describe a collaborative problem-solving game to help children explore genetics on a handheld computing device. Players breed and trade fish and participate in an experience with both single and multi-player facets. Like a cellular telephone, a handheld computer also has limited resources and size. Geney is primarily an educational tool, where a small number of genetic traits allow children to quickly grasp a few key evolutionary concepts. Therefore, the physical representation of fish only conveys the genetic characteristics, i.e., a simple line-art image with textual description is appropriate to this goal.

Therefore, it is desirable to provide toy software for cellular telephones. In addition, it is desirable to provide a toy that mimics a real-world hobby, namely the popular Japanese pastime of breeding ornamental fish (koi). The toy should incorporate embody a rich visualization that accurately reflects the aesthetically pleasing qualities of koi breeding. In addition, it playing with the toy should be possible to continue for days, months, or even years to fit, like hobbies, gaps in our lives.

SUMMARY OF THE INVENTION

The invention provides a software toy designed for cellular telephones. The toy is based on the popular Japanese pastime of breeding ornamental fish (koi). The invented toy differs from other breeding-based games and toys by emulating an existing real-world hobby. In the invention, the characters in the toy, "digi-kois," or virtual fish look like real koi, and the breeding with the toy simulates many of the characteristics of real koi genetics.

The toy is geared to the limited storage, processing, and bandwidth of cellular telephones. First, a genetic makeup and lineage of a digi-koi is represented in a very small number of bits, i.e., less than 70 bits, thereby minimizing data storage, processing, electronic transfer of koi genotypes via two-way short messaging services (SMS). Second, the invention provides a user interface that designed for the limited input and output capabilities of cellular telephones.

As an advantage, the visualization of the fish is done by compositing from sets of image templates, and not by rendering complex graphics models as in the prior art.

BRIEF DESCRIPTION OF THE DRAWINGS

FIG. 2 is a table of koi Mendelian gene pairs according to the invention;

FIG. 5 is table of linear menu to be mapped to a keypad arrangement according to the invention;

FIG. 10 is a matrix of genes for determining colors of koi;

FIGS. 11b–d are three pattern variations derived from the stored pattern shown in FIG. 11a;

FIG. 12a is the same stored pattern shown in FIG. 11a.

FIGS. 12b–d are three edge pattern variations derived from the pattern shown in FIG. 12a;

FIG. 14 shows three variations of a head image template; and

DETAILED DESCRIPTION OF THE PREFERRED EMBODIMENT

The invention provides toy software for cellular telephones (cell phones) that mimics the aesthetically pleasing qualities of the popular Japanese hobby of breeding ornamental fish (koi) as well as real-world Mendelian genetics. Unlike most goal oriented games, the virtual fish breeding toy according to the invention is open-ended and can be played by a sole participant at any time, and at irregular intervals, e.g., while commuting, or otherwise waiting. However, the ability to trade koi with other players via messages adds an important social element to the toy. In addition, the visualization of the toy is done by compositing relatively simple image from sets of image templates. Thus, the toy does not require a lot of memory for complex graphics models or a high power rendering engine or processor as in many prior art computerized toys and games.

Figures 1A, 1B, 1C, 1D:
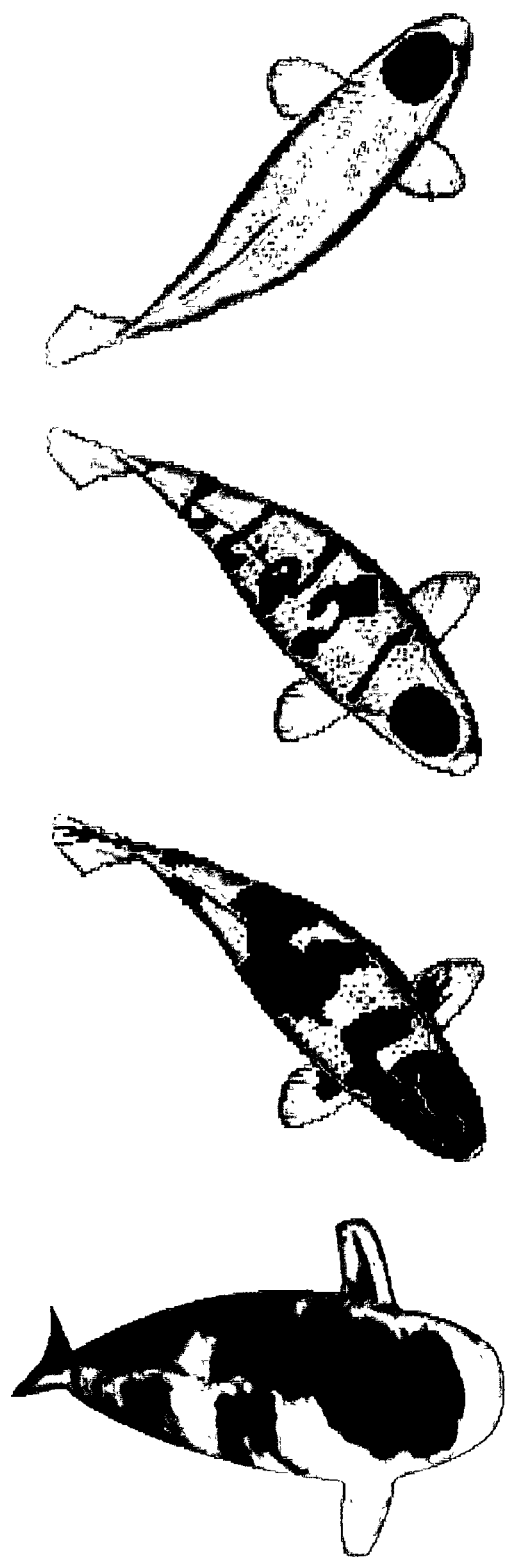
FIG. 1a is an image of a real-world koi.
FIGS. 1b–d are images of simulated koi composited from sets of image templates according to the invention.

FIG. 1a shows a real koi, and FIGS. 1b–d show images of three digi-koi generated by compositing from sets of image templates stored in the cellular phone based toy according to the invention. In all images, female koi (XY) face right, and male koi (XX) face left.

Koi Toy Experience

Unlike computer games, the digi-koi toy does not have an intrinsic goal. Instead, the primary motivation for playing is aesthetic pleasure, i.e., the typical player just wants to breed beautiful digi-koi. And, like real-world koi, digi-koi can breed year long. As an advantage of the invention, the happy digi-koi owner does not have to deal with messy ponds, algae, feeding schedules, dangerous predators, broken pumps, and other less rewarding tasks involved in real koi breeding.

Possible koi varieties that can be bred include the Kohaku, which is a koi with a white body and red accent pattern on the back. This is probably the most popular variety of koi. The Tashio Sanke is a tri-colored koi with a white body with a red pattern and black accents on the back, see FIG. 1a. The Showa Sanke is a tri-colored koi with a black body with red and white accents on the back. The Bekko and Utsuri are non-metallic koi with black on White, Red, or Yellow body. The Asagi is also a non-metallic koi with a bluish reticulated, netlike scales on top, and a red belly. The Shusui is the same as the Asagi except it has Doitsu scales. The Tancho is a koi with a red spot on the top of its head, and no red on its body. The Tancho Kohaku is a white koi with a red spot on its head, see FIG. 1d, while the Tancho Sanke is a Sanke with a red spot on its head and no red on the rest of its body, and the Tancho Showa is a Showa with a red spot on its head and no red on its body.

Figure 8:
FIG. 8 is a menu for panning a virtual pond according to the invention.

In solo play, the player browses a virtual pond of digi-koi to locate promising breeding stock, see FIG. 8. Here, the "pond" is all koi maintained by one cell phone. The player may also want to consider the parents, grandparents, and siblings of a candidate pair of digi-koi to breed to determine if the pair has desirable and complementary genes. Even with well-selected parents, the randomness of the genetic selection according to the invention may produce many offspring that do not exhibit specific visual characteristics desired by the player. However, as for real koi breeding, skilful culling of unwanted koi is an important task, see Fletcher "The Ultimate Koi," New York: Howell Book House, 1995, and Axelrod et al., "The Completely Illustrated Guide to Koi for Your Pond," TFH Publications; ISBN: 079380597X; 3rd edition, September 1996.

Figure 7:
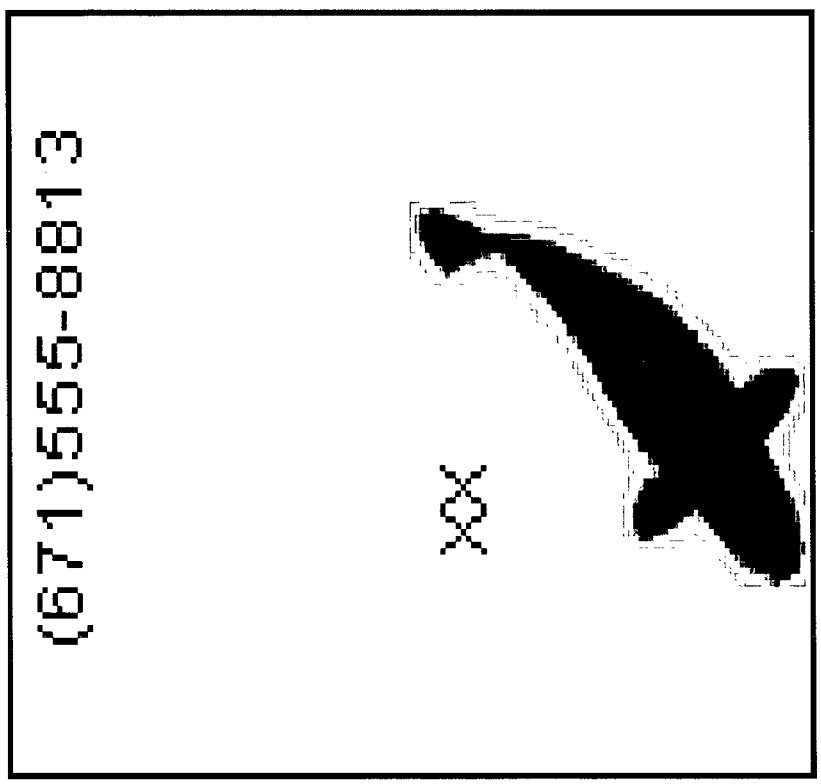
FIG. 7 is a menu arrangement for entering a telephone number.

A player can augment the gene pool in their pond by acquiring different digi-koi from other players. The trading mechanism sends digi-kois from one pond to another pond by cellular short messaging service (SMS), or other communication protocols. The ponds are identified by telephone numbers, see FIG. 7. The trading process can be complex, in a social sense, and adds significant richness to playing with the toy, because, like in the real world, the aesthetic value of a digi-koi can be hard to assess, and like real life, the breeding process has some unpredictability.

One factor that affects the digi-koi's breeding is age. To avoid traumatizing players, digi-koi do not die unless they are culled. However, digi-koi can only mate a prescribed number of times to avoid proliferation of particular set of genes. The other main factor affecting the value of a digi-koi is lineage.

In addition to moving a digi-koi between cell phone ponds, the trading mechanism allows for digi-koi to be sent to other digital devices. In this way, digi-koi can be displayed on WWW pages, rendered in 3D on a PC or game console, and sent to a manufacturer to provide a blueprint for the manufacturing of a stuffed animal koi or tie.

Koi Genetic Simulation

Each digi-Koi is modeled according a set of gene pairs that adhere to basic diploid Mendelian genetics. Over 6 trillion unique genetic combinations or genotypes, and over 100 billion unique appearances or phenotypes are possible with the genetic evolution according to the invention. While the invention does not exactly match every subtlety of koi breeding, it does simulate many of the Mendelian properties of real-world genetics. Digi-koi genes exist in allelic pairs, and the behavior of these pairs dictates the physical representation of the koi.

Gene Pairs

FIG. 2 shows a set 200 of sixteen koi Mendelian gene pairs 201 that is used to model each digi-koi. It should be understood, that genes for other characteristics can be incorporated in the set 200. Associated with each pair are phenotypes (appearances) 202, genotypes (traits) 203, and dominance characteristic 204. The dominance characteristics include dominant, co-dominant, semi-dominant, recessive, and polygenic characteristics. With co-dominance, such as color, a koi with genes for both yellow and blue colored scales exhibits green scales. Semi-dominant gene pairs, in which every unique genotype has its own phenotype, are present as well. For example, a koi with two genes for large fins has large fins, a koi with two genes for small fins has small fins, and a koi with a gene for large fins and a gene for small fins has medium-sized fins.

Genes for pattern density use a 7-bit polygenic approximation that exhibits typical breeding characteristics. For example, a densely patterned father mating with a lightly patterned mother produces medium patterned offspring. Finally, many gene pairs are epistatic to other genes pairs. Epistasis is a form of interaction between non-allelic genes in which one combination of such genes has a dominant effect over other combinations, i.e., they mask the presentation of the other gene. For example, a black base color hides the appearance of black stripes.

When a player breeds two koi, each koi contributes one gene from each pair of genes in the set to the set modeling their offspring. One gene is selected randomly from the pair. Genes are passed on to the offspring according to Mendel's law of independent assortment.

In a preferred, embodiment, each set of genes is stored as a vector of elements, where the vector elements control the stacked compositing of the sets of image templates as described below.

Figure 3:
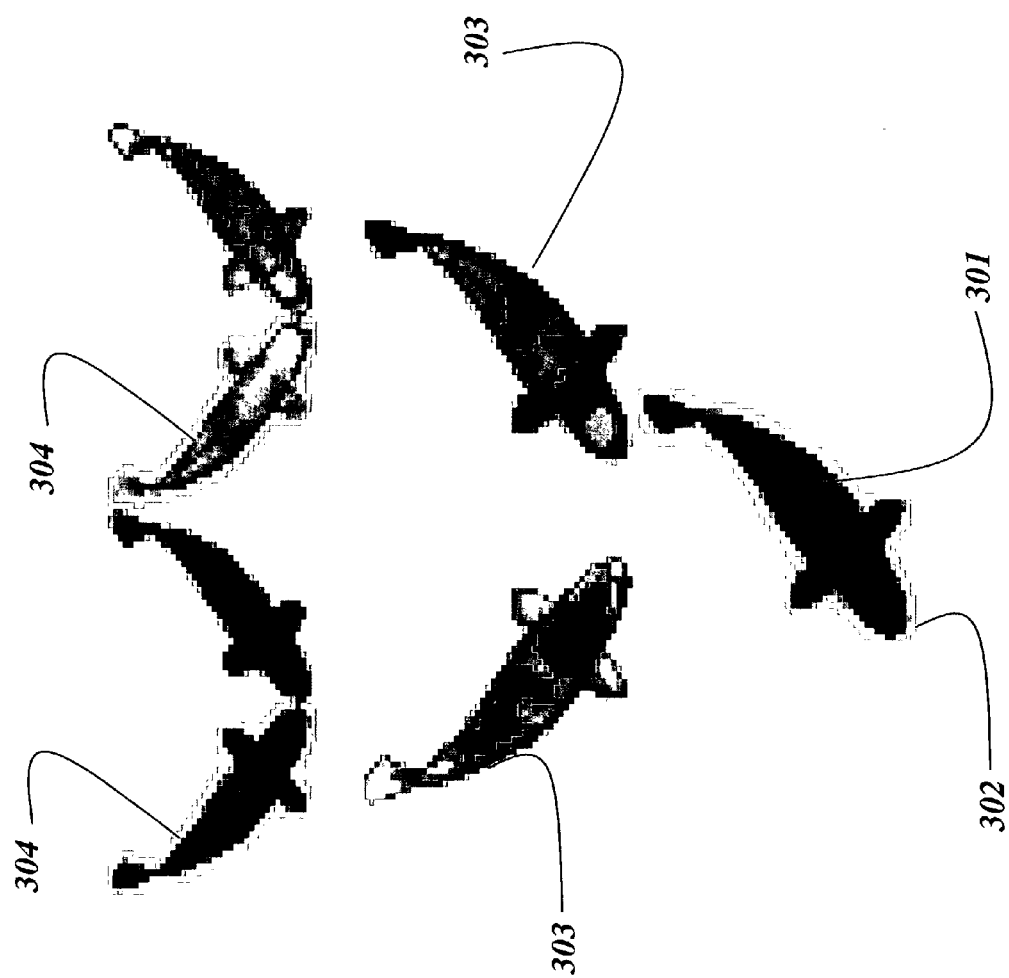
FIG. 3 is an image of koi lineage.

As shown in FIG. 3, the digi-koi software toy includes a lineage tool for viewing a koi's ancestors, because players cannot view genes directly. The lineage can be stored in a tree-like data structure in a portion of the memory of the cell phone.

The selected koi 301 exhibits a phenotype for a recessive trait, e.g., lustrous shiny scales indicated by its glow 302 around the periphery of the koi. One can see that neither of the parents 303 exhibited this trait, therefore, both parents must be carriers of this recessive gene. When one looks at the grandparents, one sees that both of the koi's grandmothers 304 have shiny scales. Both grandmothers have passed on this gene to their children 303, who both passed it on to the male grandchild koi 301. By examining the ancestors and appearance of a koi, a player gains an understanding of its genetics, and can then better select koi for breeding.

The User Interface

The invention also provides an input/output (I/O interface that is specifically designed for cellular telephones. The I/O interface accommodates two primary interface functions, i.e., action selection and browsing.

Figure 4A:
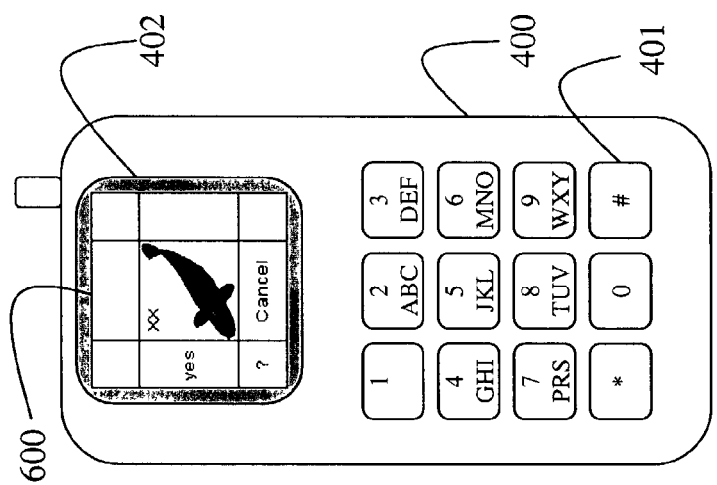
FIG. 4a is a front view of a cellular phone with an I/O interface according to the invention.

FIG. 4a shows a cellular telephone 400 used with the invention. The telephone includes a numeric keypad 401 and a display 402. The keys are the numbers 0–9, and * and #. The display shows a menu 600 spatially arranged to match the layout of the keypad 401.

Figure 4B:
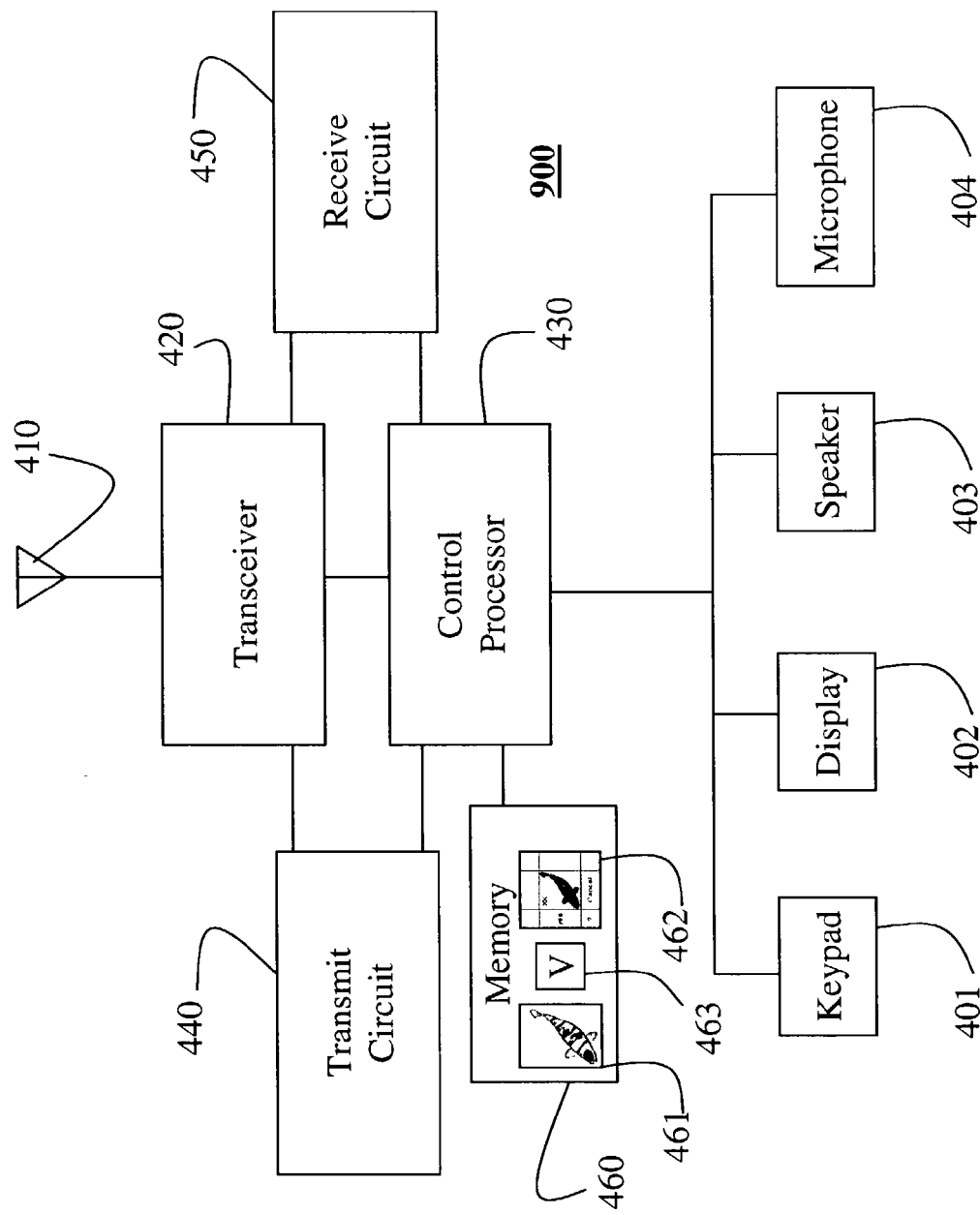
FIG. 4b is a block diagram of a cellular phone according to the invention.

FIG. 4b shows a block diagram of the cell phone according to the invention. The phone includes an antenna 410 coupled to a transceiver 420. The transceiver 420 is connected to a transmit circuit 440 and a receive circuit 450. Overall operation is managed by a control processor 430, which also controls the key pad 401, the display 402, and a speaker 403 and a microphone 404. The phone also includes DSP, A/D, D/A, and codec circuits, not shown.

A memory 460 is connected to the control processor 430. The memory can include ROM, RAM and flash memories. A portion of the memory is allocated as an image buffer 461, a screen buffer 462, and a vector buffer (V) 463. The image buffer 461 is used to build intermediate image, while the screen buffer 462 reflects what is shown on the display 402. The two buffers can be the same size, corresponding to the number of pixels on the display 402. The memory also stored the vectors 463 that control the compositing of koi images. The memory also stores the sets of template images used to produce the digi-koi according to the invention.

The processes described herein are also stored in the memory 460 and execute in the control processor 430, e.g., a StronArm™ class microprocessor.

Most conventional computer and cell phone applications utilize linear menus 500, see FIG. 5, to issue commands. The items in a menu are presented vertically, as they would be in a pull-down menu on a desktop computer. Pull-down menus were originally designed to be used with a mouse or similar pointing device, an input mechanism these cell phones lack. Linear menu items are either selected by scrolling up and down or by pressing the key on the keypad that corresponds to the number in the linear menu entry. Because the keys on the cell phone keypad are not laid out in a vertical fashion, a user must translate menu items from linear menu space into two-dimensional keypad space before making a selection.

Figure 6:
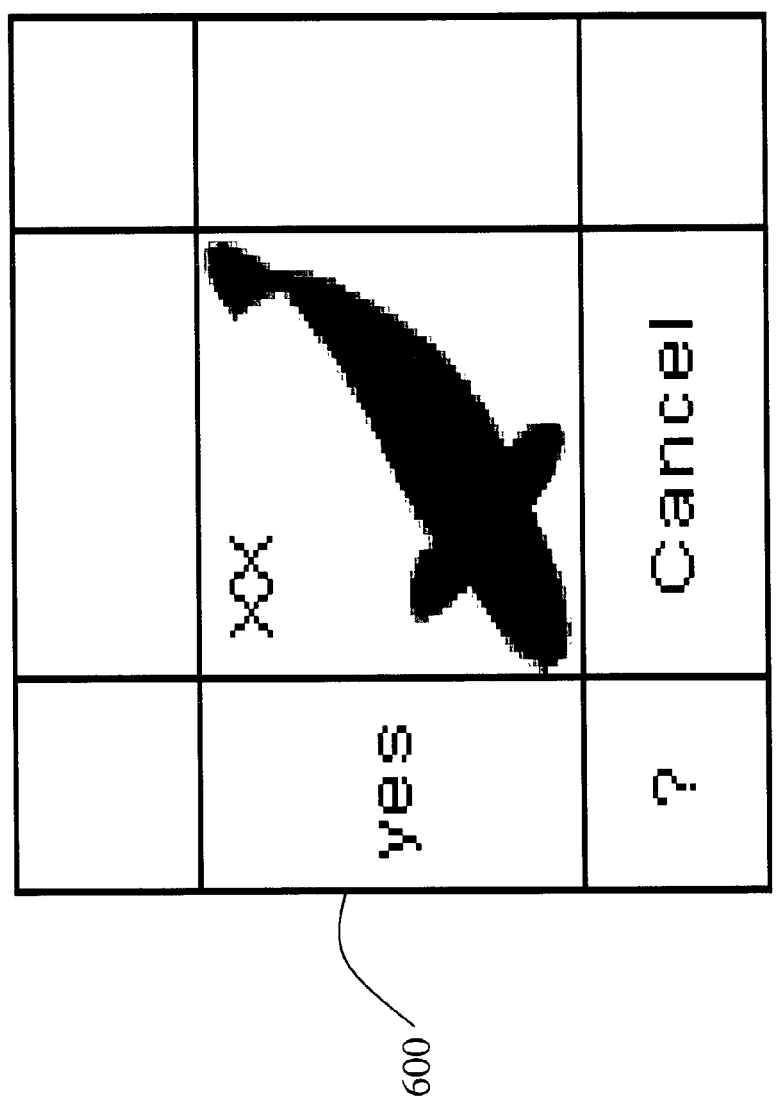
FIG. 6 is a menu arrangement for a deletion action according to the invention.

With the input output interface according to the invention, the spatial arrangement of a displayed menu 600 items is according to keypad coordinates, as shown in greater detail in FIG. 6. For menus that contain more than nine or twelve commands, hierarchical menus are used. A menu item's sub-commands fill the remaining eight regions upon selection of the parent. The player user issues commands nested within a menu by using a sequence of keystrokes.

One of the benefits of the menu arrangement according to the invention is that common operations are performed via short, easy-to-remember number sequences. For example, from the pond-browsing mode the number sequence 5-7-4 transitions to the action-selection menu, chooses the deletion action, see FIG. 7, confirms the deletion and returns to the pond-browsing menu. The sequence 5-4-5 transitions from pond browsing, selects a parent, and transitions back to pond browsing.

Tasks such as these, that require more than one step, leverage the player's procedural memory: common operations become second nature.

Browsing the Virtual Pond via Discrete Panning with Partial Context

Browsing a virtual pond of digi-koi presents another problem. The virtual pond is arranged as a grid, in which each cell is either empty or occupied by a single digi-koi. A pan-and-zoom approach to browsing is not possible because the cell phone's CPU is not powerful enough to support continuous, animated navigation of the grid. A discrete version of panning, in which the grid is traversed one whole cell at a time, can leave the user disoriented because there are no visual cues for location within the grid.

Our solution is a modification of the discrete-panning metaphor in which neighboring cells are partially visible. Discrete panning with partial context gives the user a sense of location while browsing the grid. Panning a virtual pond is achieved via the keypad, e.g., key 2 moves to the cell directly above, and key 3 moves diagonally up and to the right. Key 5 is used to switch to the action-selection selection menu. As shown in FIG. 8, parts of neighboring cells are shown to provide some context within the pond.

Compositing Images of the Koi

The memory limitations of a cell phone preclude storing the billions of unique possible koi images. Processor limitations preclude the use of a rendering engine to generate images from stored models. Therefore, kois are stored in the cell phone memory as sets of 68-bit gene sequences, see FIG. 2. Images of the koi are visualized by compositing a small number of stored sets of image templates, in ways dictated by the gene sequence, i.e., sets 200. The compositing according to the invention stacks image templates on top of each other.

Figure 9A:
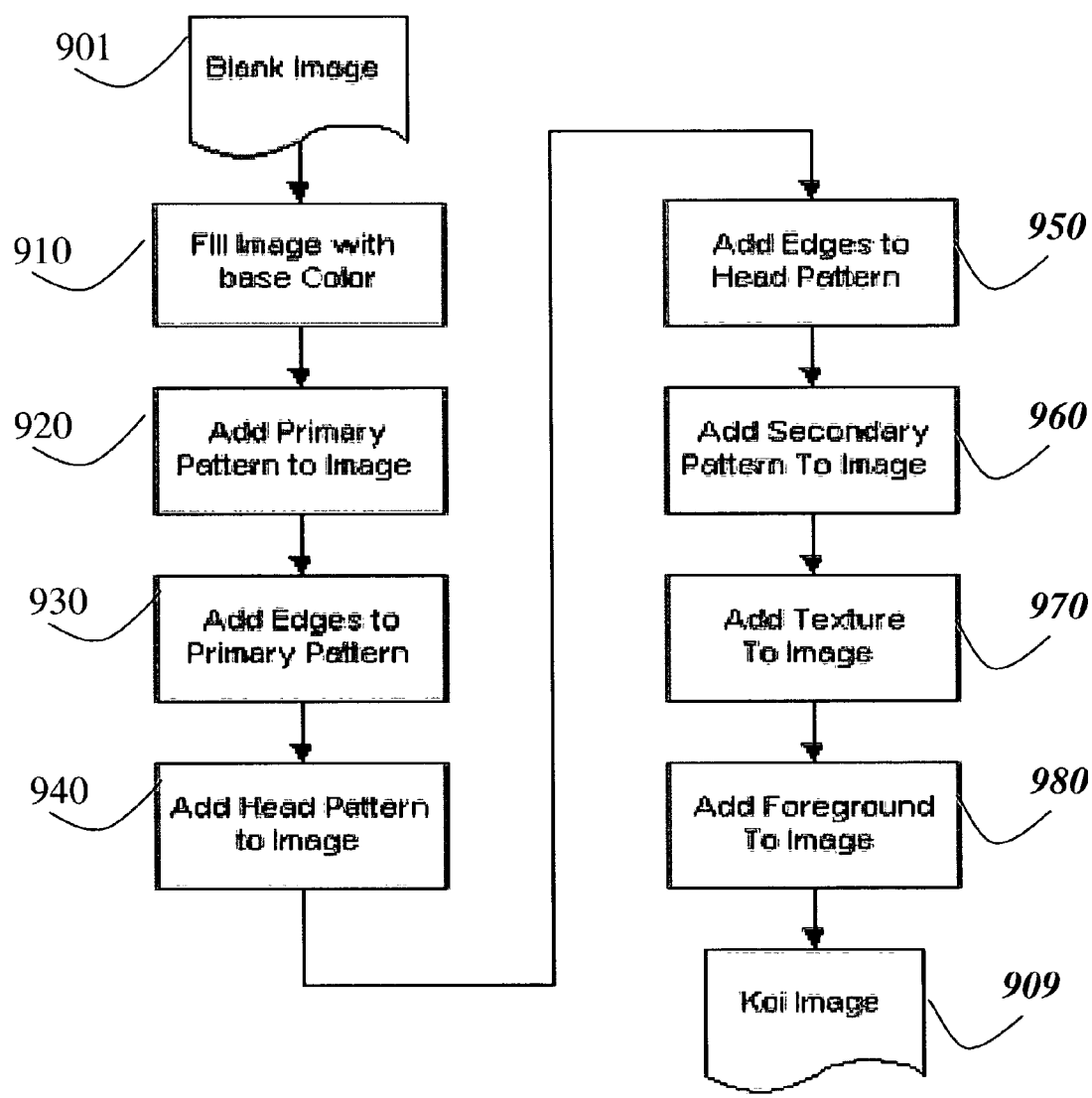
FIG. 9a is a flow diagram of a method for compositing sets of koi templates images according to the invention.
Figure 9B:
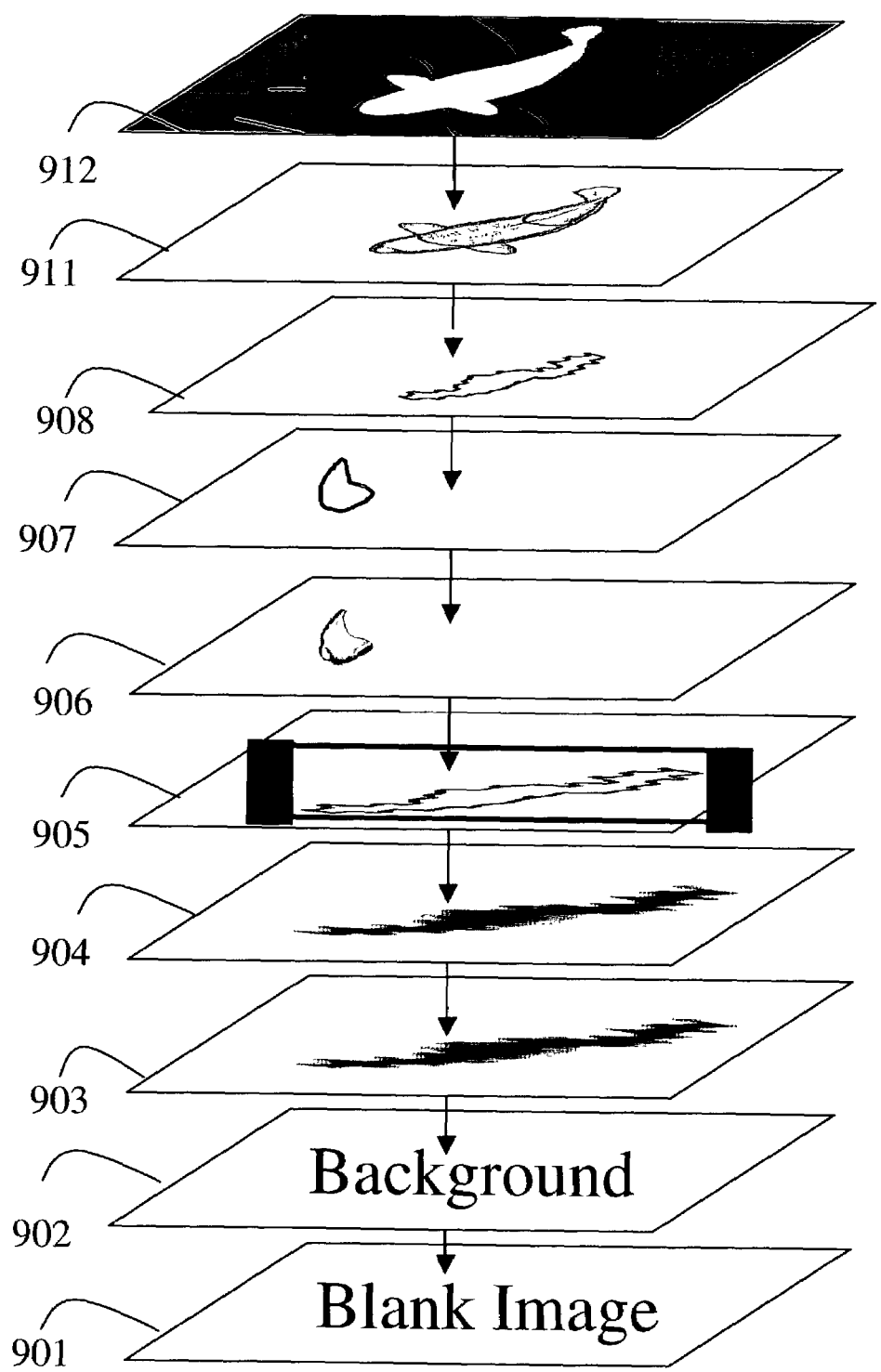
FIG. 9b is a block diagram of a stack of composited image templates.

The steps 900 taken to composite the koi image from the sets of image templates are detailed in FIGS. 9a. FIG. 9b shows how selected image templates are stacked on top of each other. The manner in which templates are modified and stacked is controlled by the vectors that encode the sets of gene pairs for each koi. It should be understood that additional steps for other visible characteristics can be incorporated into this compositing sequence. Koi images are composited into the image buffer 461.

The first step 910 fills a blank image 901 with a base (background) color 902 of the koi. The background color is derived from the base color gene pair of the set 200, see FIG. 2. It should be understood that setting all pixels in an image buffer to a single color is an extremely simple operation. In effect, here, the template is the color gene pair.

FIG. 10 shows a matrix 1000 of the resulting background colors for all possible gene pairs. For example, a koi with one gene for a yellow background 1001 and the other gene for a blue background 1002 has a green color 1003. It should be understood that additional colors can be added to this matrix.

Figure 11D:
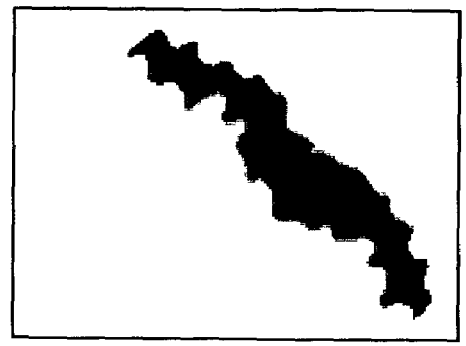
Figure 11C:
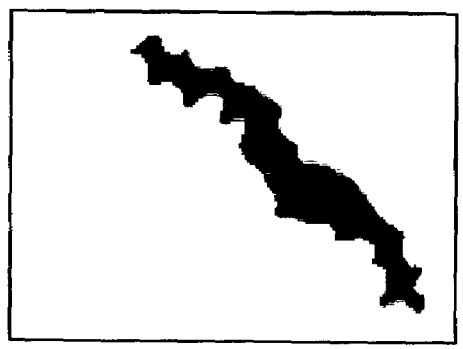
Figure 11B:
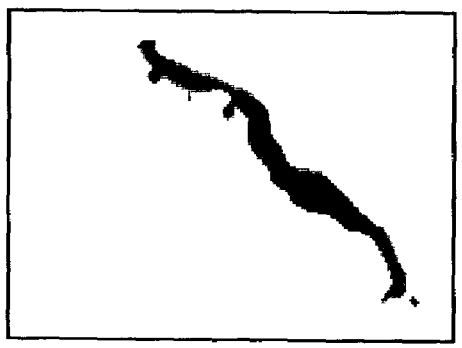
Figure 11A:
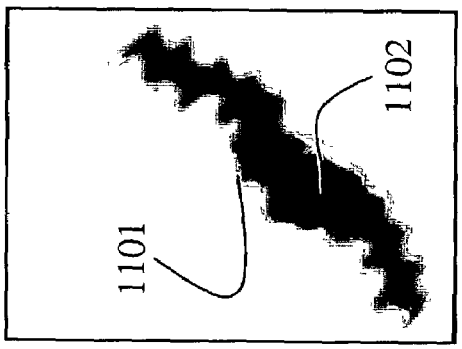
FIG. 11a is an image of a stored pattern.

The next step 920 composites the shape of the primary pattern 903. The koi's primary pattern shape gene pair determines which one of a set of patterns image templates is used to composite the primary pattern. FIG. 11a shows one such primary pattern image template. The primary pattern is one image template used by the invention. The pixels in the primary pattern are assigned gray-scale values. For example, pixels 1101 near the edge of the pattern have a lighter color than pixels 1002 in the middle of the pattern.

The gene for the density of the primary pattern 904 maps to a pixel threshold intensity value that is used during the compositing of the shape of the primary pattern. All pixels having a darker (greater) than intensity than this threshold value are retained, and all pixels lighter (less) than this value are ignored. FIGS. 11b, 11c, and 11d show three possible primary patterns shapes all derived from the single prototype pattern shown in 11a, using increasing thresholds from left to right. It should be understood that thresholding pixels intensity in an image buffer can be done with a small set of instructions.

Figure 12D:
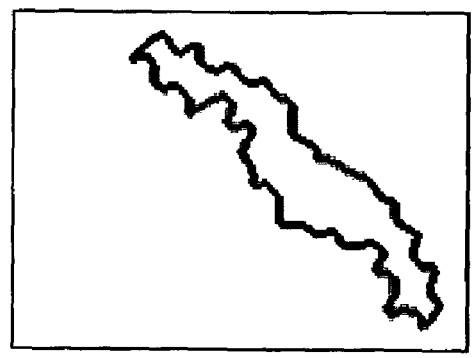
Figure 12C:
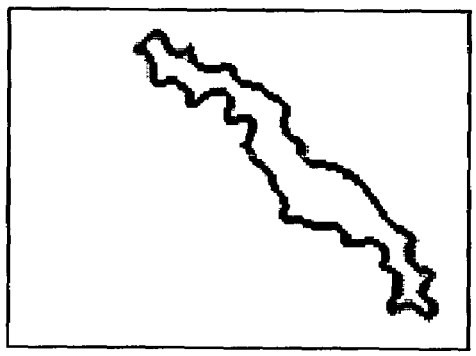
Figure 12B:
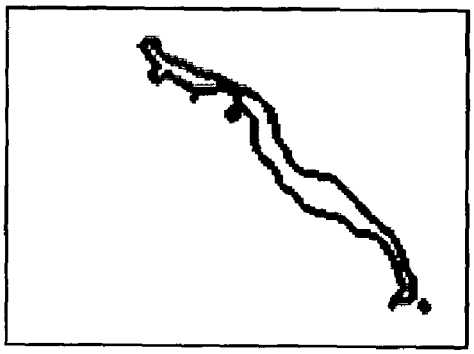
Figure 12A:
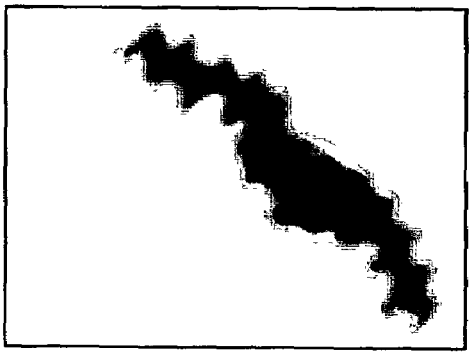

The next step 930, composites the edge 905 of the primary pattern. As shown in FIG. 12a, the edges are also derived from the primary shape pattern. However, this time only pixels within a small range of the threshold value are composited. FIGS. 12b, 12c, and 12d show three possible primary pattern edges all derived from the pattern shown in 12a.

Compositing the head pattern 906 and secondary pattern 908, steps 940 and 960, into the image buffer works in the same way as for the primary pattern, however, a different gene pairs and a different partial image is used. Compositing 950 the edge 907 of the head pattern also works in a similar way.

Figure 13:
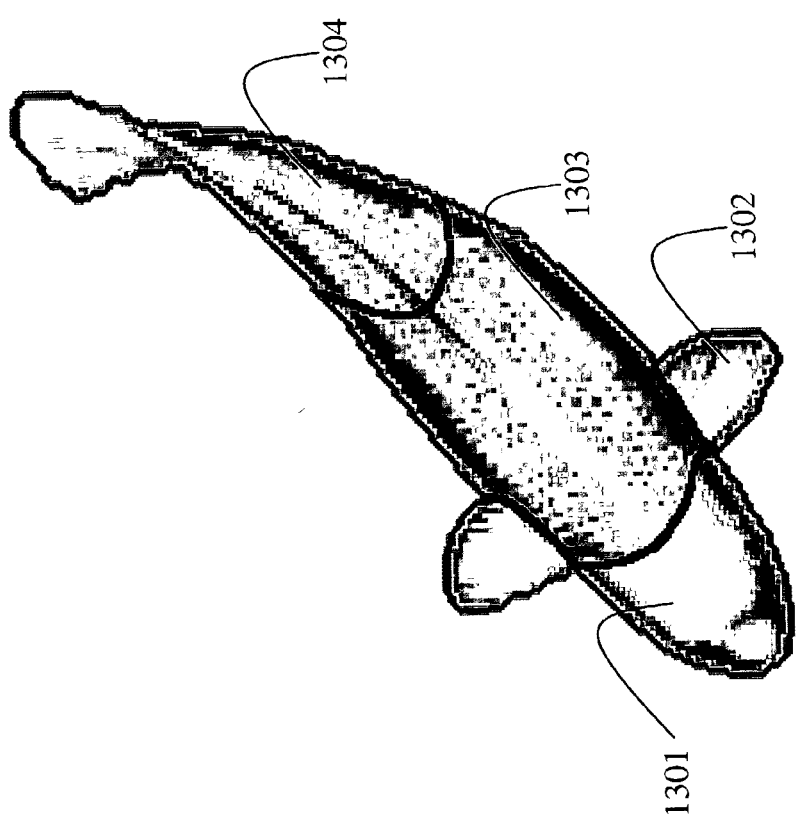
FIG. 13 is a diagram showing image templates of fish texture.

Next, texture 911 is composited 970 using the genes for the size of the head, body, tail, and fins. FIG. 13 shows a complete texture that is for a koi that is composited from a set of partial images for the head 1301, fins 1302, body 1303, and tail 1304. FIG. 14 shows three texture image templates of with variations of the head size. It should be noted that the texture is blended with pixels already in the image buffer. This can be done by a multiply operation, instead of an overwrite as for the other stacked compositing steps.

Figure 15:
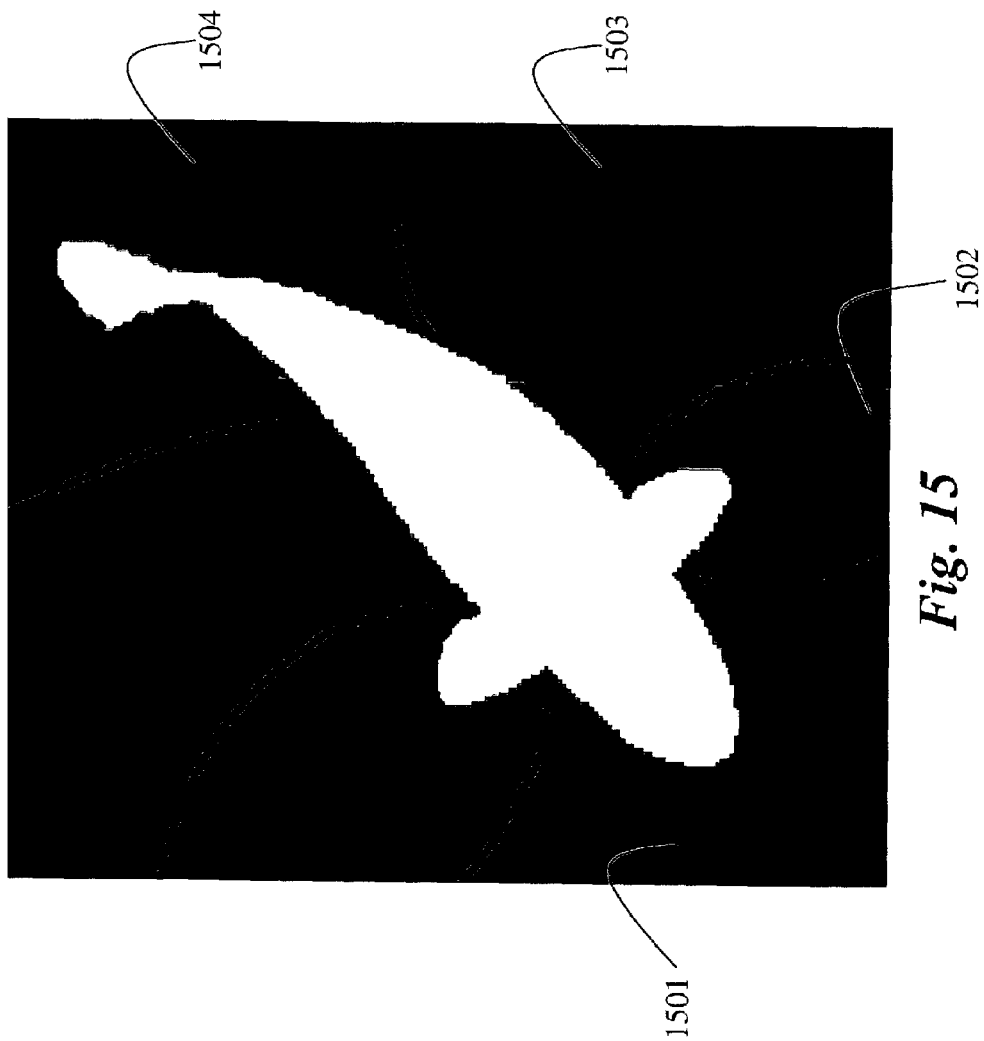
FIG. 15 shows composited foreground image templates.

Finally, the foreground 912, as shown in FIG. 15, is composited 980 into the image buffer. Genes for the size of the head, body, tail, and fins determine which partial foreground images make up the head foreground 1501, fin foreground 1402, body foreground 1403, and tail foreground 1404. This stacked compositing produces the koi image 909. Other visual features, such as the lightning like shape, shininess can be added where appropriate.

Figure 9C:
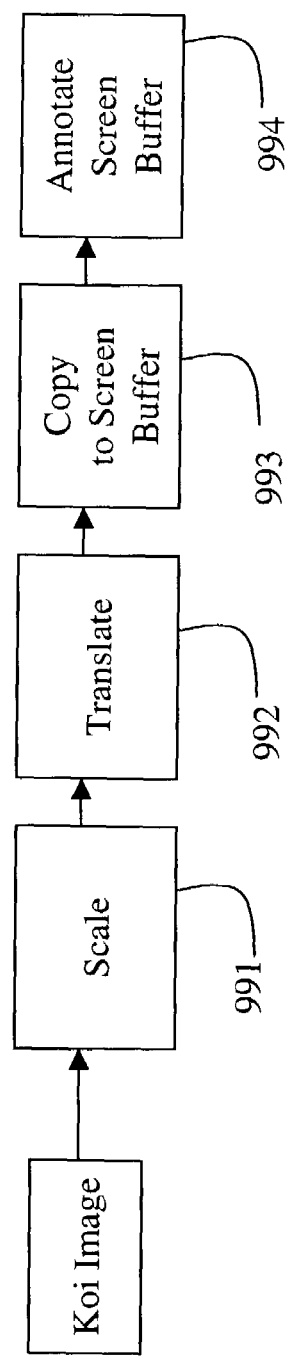
FIG. 9c is a flow diagram of a method for scaling composited images.

As shown in FIG. 9c, the koi image 909 in the image buffer can scaled 991 to some other size. For example, to reduce the image to half its size, every other pixel is selected. After, scaling, the image can be translated 992 to place it at the desired (x, y) location. The scaling can include orientation, for example, positioning the koi according to the sex gene. The final image can then be copied 993 to the screen buffer. As final step, the screen buffer can be annotated 994 to overlay any additional text, such as sex markers, koi names, and telephone numbers. The above steps can be repeated depending on the number of kois that need to be displayed.

This invention is described using specific terms and examples. It is to be understood that various other adaptations and modifications may be made within the spirit and scope of the invention. Therefore, it is the object of the appended claims to cover all such variations and modifications as come within the true spirit and scope of the invention.

We claim:

1. A cellular telephone breeding toy comprising:
a first memory of the cellular telephone configured to store a plurality of vectors, each vector representing genetic traits of a corresponding breedable object, the genetic traits including a set of gene pairs associated with phenotypes, genotypes, and dominance characteristics of the corresponding breedable object;
a second memory of the cellular telephone configured to store a plurality of sets of image templates, there being at least one element of each vector associated with each image template;
input means for selecting a first one of the plurality of vectors associated with a first corresponding breedable object and a second one of the plurality of vectors associated with a second breedable object;
means for combining, according to the genetic traits, the first one of the plurality of vectors and the second one of the plurality of vectors into genetics traits of a third breedable object;
means for storing the genetic traits of the third breedable object as one of the vectors in the first memory;
processor means for compositing selected ones of the image templates according to the genetic traits of the third breedable object, the compositing stacking the selected image templates in an image buffer of the memory in a predetermined order; and
a screen buffer coupled to the image buffer to render an image of the third breedable object according to the genetic traits on a display of the cellular telephone.

2. The cellular telephone breeding toy of claim 1 further comprising;
third memory storing a lineage of the third breedable object; and
means for displaying ancestors of the third breedable object.

3. The cellular telephone breeding toy of claim 1 wherein the genetic traits include gender, size, color, and patterns.

4. The cellular telephone breeding toy of claim 1 wherein the set of gene pairs is associated with phenotypes, genotypes, and dominance characteristic of each corresponding breedable object.

5. The cellular telephone breeding toy of claim 1 wherein the dominance characteristics include dominant, co-dominant, semi-dominant, recessive, and polygenic characteristics.

6. The cellular telephone breeding toy of claim 1 wherein the genetic traits are combined randomly.

7. The cellular telephone breeding toy of claim 1 wherein the genetic traits represent a background color, primary pattern, head pattern, secondary pattern, texture, of each corresponding breedable object.

8. The cellular telephone breeding toy of claim 1 wherein a particular genetic trait can only be combined a predetermined number of times.

9. The cellular telephone breeding toy of claim 1 further comprising:
means for communicating selected genetic traits with another cellular telephone.

10. The cellular telephone breeding toy of claim 1 wherein each breedable object is a virtual fish.

11. The cellular telephone breeding toy of claim 10 further comprising:
means for displaying the virtual fish in a virtual pond.

12. The cellular telephone breeding toy of claim 10 further comprising:
means for generating a physical object from the image of the corresponding breedable object.

* * * * *